(12) United States Patent
Bae et al.

(10) Patent No.: US 11,216,550 B2
(45) Date of Patent: Jan. 4, 2022

(54) SECURITY-ENHANCED IMAGE DISPLAY METHOD AND ELECTRONIC DEVICE PERFORMING SAME

(71) Applicant: Samsung Electronics Co., Ltd., Gyeonggi-do (KR)

(72) Inventors: Jong Kon Bae, Seoul (KR); Yo Han Lee, Seoul (KR); Yun Pyo Hong, Seoul (KR); Dong Hwy Kim, Gyeonggi-do (KR); Dong Kyoon Han, Gyeonggi-do (KR); Tae Sung Kim, Gyeonggi-do (KR); Kwang Tai Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/633,475

(22) PCT Filed: Aug. 23, 2018

(86) PCT No.: PCT/KR2018/009751
§ 371 (c)(1),
(2) Date: Jan. 23, 2020

(87) PCT Pub. No.: WO2019/039890
PCT Pub. Date: Feb. 28, 2019

(65) Prior Publication Data
US 2020/0159904 A1 May 21, 2020

(30) Foreign Application Priority Data

Aug. 23, 2017 (KR) .................. 10-2017-0106848

(51) Int. Cl.
*G06F 21/36* (2013.01)
*G06F 21/84* (2013.01)
*G09G 3/3208* (2016.01)

(52) U.S. Cl.
CPC .............. *G06F 21/36* (2013.01); *G06F 21/84* (2013.01); *G09G 3/3208* (2013.01); *G09G 2358/00* (2013.01)

(58) Field of Classification Search
CPC ................ G09G 5/14; G09G 2340/10; G09G 2340/125; G09G 5/395; G06T 11/60; H04N 5/44504; G06F 3/14
See application file for complete search history.

(56) References Cited

U.S. PATENT DOCUMENTS 6,611,253 B1 * 8/2003 Cohen .................. G06F 3/0418
345/168
7,499,545 B1 3/2009 Bagshaw
(Continued)

FOREIGN PATENT DOCUMENTS

KR   100408921   11/2003
KR   101259824   4/2013
(Continued)

OTHER PUBLICATIONS

PCT/ISA/210 Search Report issued on PCT/KR2018/009751, pp. 5.
PCT/ISA/237 Written Opinion issued on PCT/KR2018/009751, pp. 4.

*Primary Examiner* — Todd Buttram
(74) *Attorney, Agent, or Firm* — The Farretl Law Firm, P.C.

(57) ABSTRACT

An electronic device is provided. The electronic device includes a display, a processor, and a display driver integrated circuit (IC) configured to drive the display.

4 Claims, 16 Drawing Sheets

(56) References Cited

U.S. PATENT DOCUMENTS

| | | | |
|---|---|---|---|
| 8,683,199 | B2 | 3/2014 | Furuichi et al. |
| 9,177,500 | B2 | 11/2015 | White et al. |
| 9,183,373 | B2 | 11/2015 | Lioy |
| 9,871,664 | B2 | 1/2018 | Yoon et al. |
| 10,310,733 | B2 * | 6/2019 | Kim .................. G06F 3/041662 |
| 10,430,918 | B2 | 10/2019 | Kim et al. |
| 2004/0247289 | A1 | 12/2004 | Choi |
| 2011/0071911 | A1 * | 3/2011 | Tung ..................... G06Q 30/02 705/14.73 |
| 2012/0251002 | A1 * | 10/2012 | Gotoh ................... H04N 19/50 382/173 |
| 2014/0085321 | A1 * | 3/2014 | Bae .......................... G09G 5/39 345/536 |
| 2014/0149916 | A1 * | 5/2014 | Manoff ............... G06F 3/04883 715/781 |
| 2016/0012772 | A1 | 1/2016 | White et al. |
| 2016/0335940 | A1 | 11/2016 | You |
| 2017/0109861 | A1 | 4/2017 | Lifshitz et al. |
| 2017/0257525 | A1 * | 9/2017 | Noda .................... H04N 1/4413 |
| 2018/0300771 | A1 * | 10/2018 | Roger ................ G06F 16/9566 |

FOREIGN PATENT DOCUMENTS

| | | |
|---|---|---|
| KR | 1020140017539 | 2/2014 |
| KR | 1020160012022 | 2/2016 |
| KR | 1020160046121 | 4/2016 |
| KR | 101649908 | 8/2016 |
| KR | 101661258 | 9/2016 |
| KR | 1020160132620 | 11/2016 |

* cited by examiner

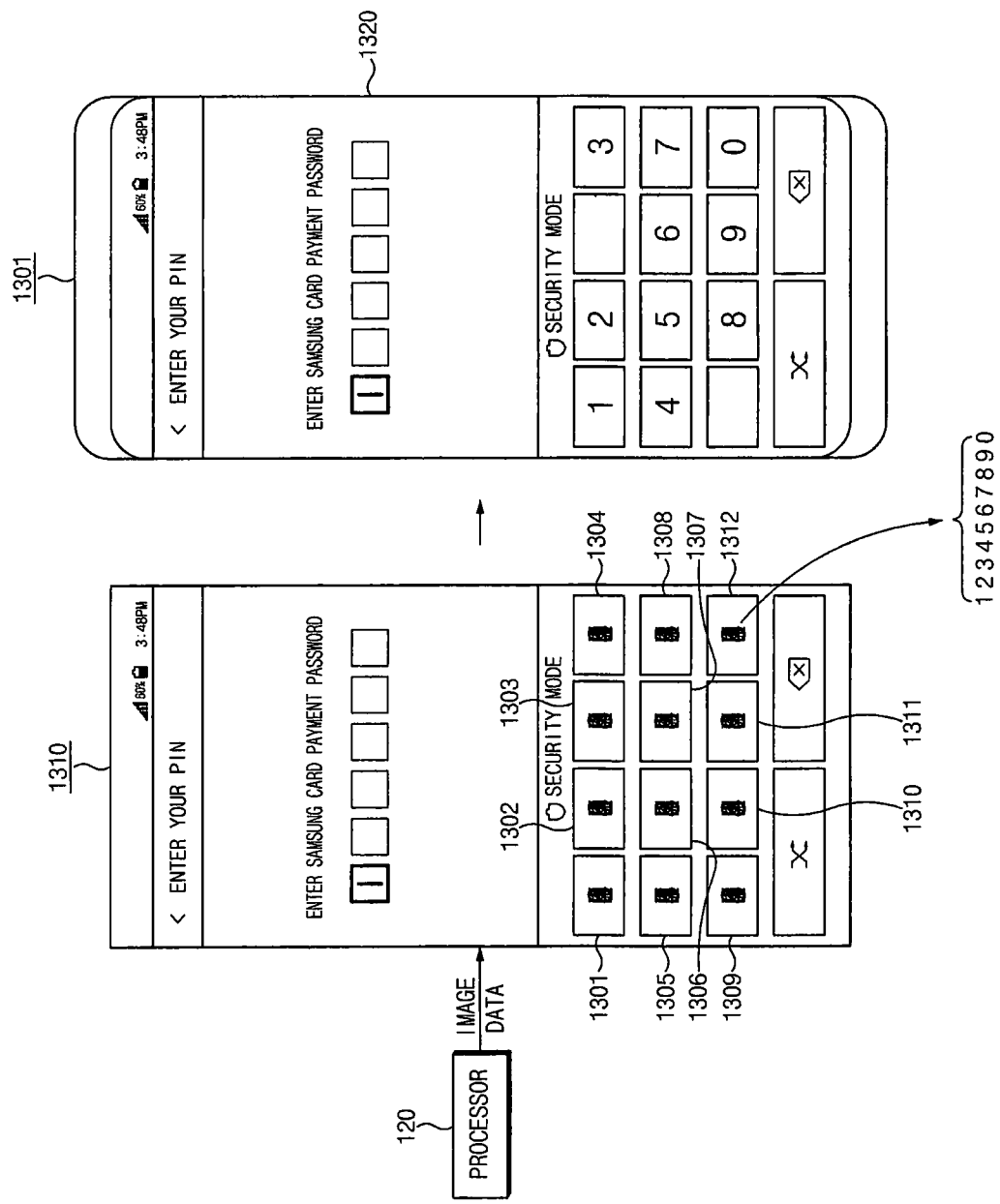

SECURITY-ENHANCED IMAGE DISPLAY METHOD AND ELECTRONIC DEVICE PERFORMING SAME

PRIORITY

This application is a National Phase Entry of PCT International Application No. PCT/KR2018/009751 which was filed on Aug. 23, 2018, and claims priority to Korean Patent Application No. 10-2017-0106848, which was filed on Aug. 23, 2017, the content of each of which is incorporated herein by reference.

TECHNICAL FIELD

The present disclosure relates to an image display method with enhanced security and an electronic device for performing the same.

BACKGROUND ART

Recently, with the development of mobile communication technology, electronic devices have been changed in the form of being easily carried and being freely accessible to wired and wireless networks. Each of portable electronic devices, such as smartphones and tablet personal computers (PCs), may support various functions, such as Internet access, mobile payment, and mobile banking, other than a function of transmitting and receiving calls and messages.

Mobile payment and Internet banking may use user unique information (e.g., biometric information or a personal identification number (PIN)). Thus, various security policies are applicable to applications for the mobile payment and the mobile banking to prevent the third party (e.g., a defrauder) from taking user unique information. The above information is presented as background information only to assist with an understanding of the present disclosure. No determination has been made, and no assertion is made, as to whether any of the above might be applicable as prior art with regard to the present disclosure.

DISCLOSURE

Technical Problem

Applications and various security policies for mobile payment and mobile banking are mainly focused on utilizing encryption or blocking unauthorized access in software. However, result data is still vulnerable to security in the process of being provided to hardware (e.g., a display or the like).

For example, referring to FIG. 14, a PIN authentication screen by a mobile payment application or a mobile banking application may be displayed on a display of an electronic device 1401. An authentication procedure utilizing a PIN may be protected by various security policies adopted by the mobile payment application and the mobile banking application. However, for example, when the third party takes image data for the PIN authentication screen from a graphic random access memory (GRAM) included in a display driver integrated circuit (DDI) (e.g., in real time), a PIN of a user, exposed on the PIN authentication screen, may be known to the third party. In other words, although security for user unique information is sufficient on a software plane, there is still a concern that user unique information is exposed to the third party on a hardware plane. Aspects of the present disclosure are to address at least the above-mentioned problems and/or disadvantages and to provide at least the advantages described below. Accordingly, an aspect of the present disclosure is to provide a method for protecting sensitive information (e.g., user unique information) included in image data although the third party takes the image data from a GRAM included in a DDI and an electronic device for performing the same.

Technical Solution

In accordance with an aspect of the present disclosure, an electronic device is provided. The electronic device may include a display, a processor, and a display driver integrated circuit (DDI) configured to drive the display. The DDI may include a graphic random access memory (GRAM) storing a first image received from the processor, a memory storing a second image including a plurality of partial images, an image merging module configured to read at least one partial image control information received from the processor is indicative of from the memory, read the first image from the GRAM, and merge the at least one partial image with the first image, and a display timing controller configured to generate a signal corresponding to the merged image and provide the generated signal to the display.

In accordance with another aspect of the present disclosure, an electronic device is provided. The electronic device may include a display, a DDI configured to drive the display, and a processor. The processor may be configured to modulate pixel values configuring image data and provide the modulated image data to the DDI. The DDI may be configured to demodulate the modulated image data and generate a signal corresponding to the demodulated image data and provide the generated signal to the display.

Advantageous Effects

According to various embodiments, although the third party takes image data from a GRAM included in a DDI, he or she may fail to obtain sensitive information such as user unique information. Thus, security on a hardware plane about the user unique information may be further enhanced. In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

DESCRIPTION OF DRAWINGS

The above and other aspects, features, and advantages of certain embodiments of the present disclosure will be more apparent from the following description taken in conjunction with the accompanying drawings, in which:

FIGS. 8 to 13 are drawings illustrating a modulation method according to various embodiments.

MODE FOR INVENTION

Figure 1:
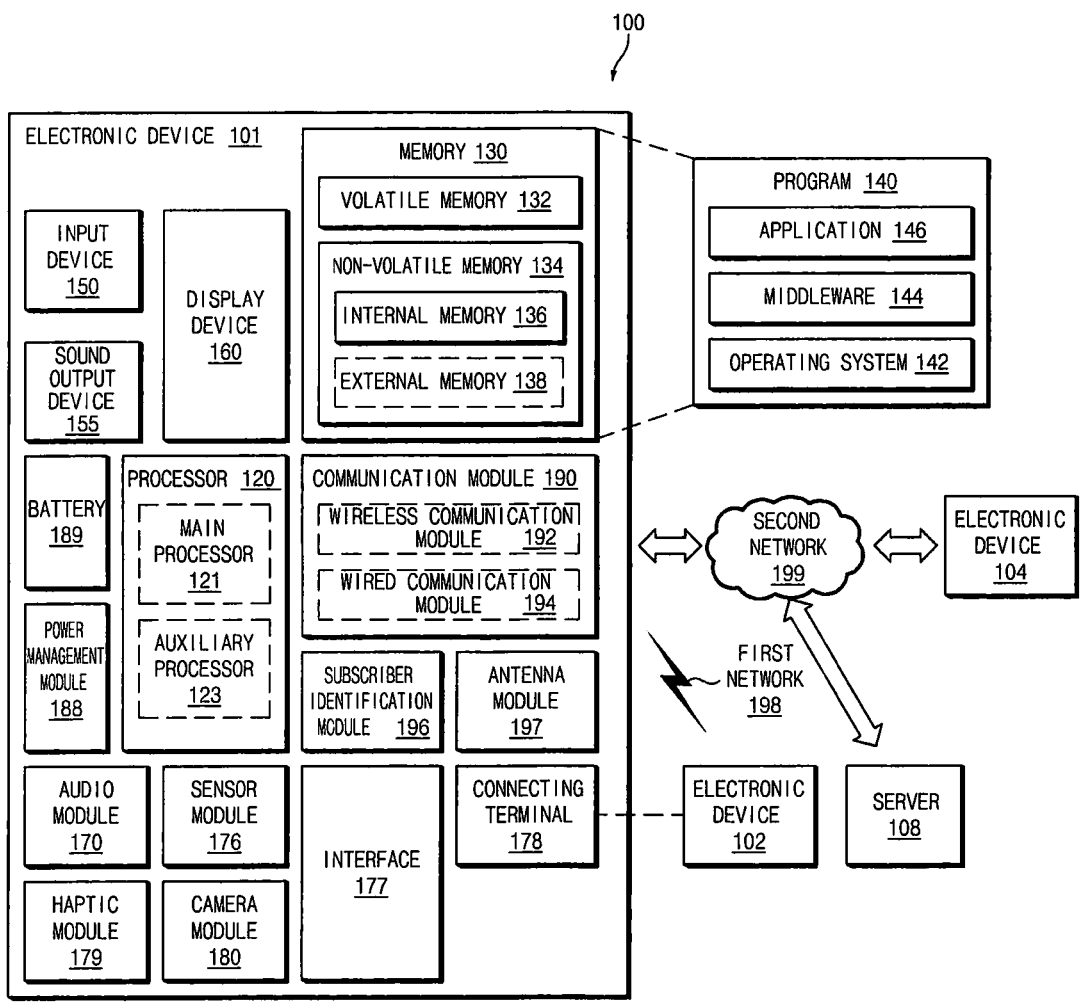
FIG. 1 is a block diagram illustrating a configuration of an electronic device in a network environment for displaying an image with enhanced security according to various embodiments.

FIG. 1 is a block diagram of an electronic device 101 in a network environment 100 according to various embodiments. Referring to FIG. 1, the electronic device 101 may communicate with an electronic device 102 through a first network 198 (e.g., a short-range wireless communication) or may communicate with an electronic device 104 or a server 108 through a second network 199 (e.g., a long-distance wireless communication) in the network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
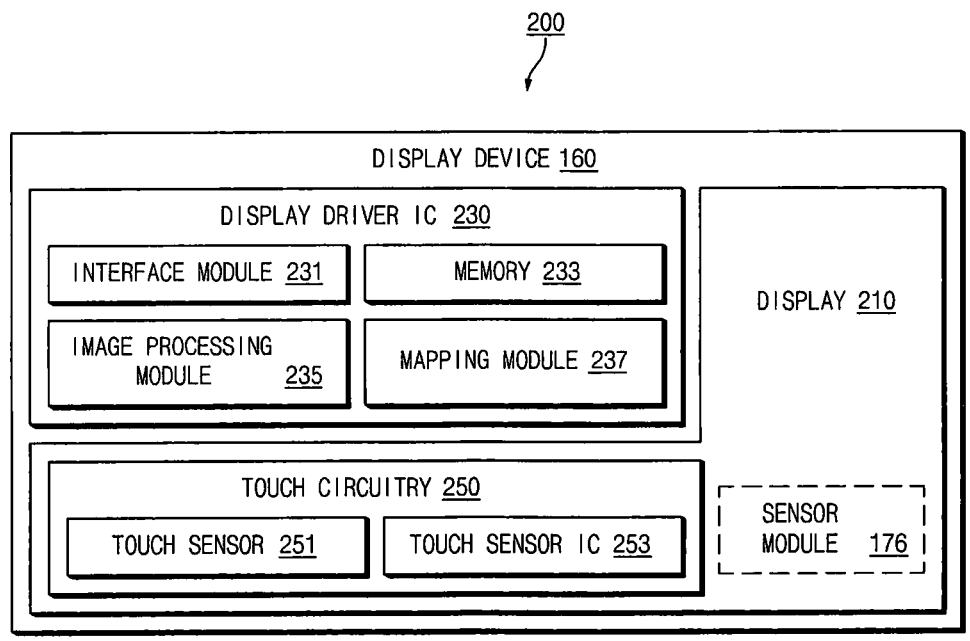
FIG. 2 is a block diagram illustrating a configuration of a display device for displaying an image with enhanced security according to various embodiments.

FIG. 2 is a block diagram 200 of a display device 160 according to various embodiments. Referring to FIG. 2, the display device 160 may include a display 210 and a display driver IC (DDI) 230 for controlling the display 210. The DDI 230 may include an interface module 231, a memory 233 (e.g., a buffer memory), an image processing module 235, or a mapping module 237. The DDI 230 may receive, for example, image data or image information including an image control signal corresponding to a command to control the image data, from a processor 120 of FIG. 1 (e.g., a main processor 121 of FIG. 1 (e.g., an application processor) or an auxiliary processor 123 of FIG. 1, operated independently of a function of the main processor 121) through the interface module 231. The DDI 230 may communicate with a touch circuit 250, a sensor module 176, or the like via the interface module 231. Further, the DDI 230 may store at least a portion of the received image information in the memory 233, for example, on a frame-by-frame basis. The image processing module 235 may perform, for example, preprocessing or post-processing (e.g., resolution, brightness, or size adjustment) of at least a portion of the image data based at least in part on a characteristic of the image or a characteristic of the display 210. The mapping module 237 may convert the image data preprocessed or post-processed through the image processing module 135 into a voltage value or a current value at which pixels are able to be driven, based at least in part on properties of the pixels of the display 210 (e.g., an array (an RGB stripe or pentile) of the pixels or a size of each of sub-pixels). As at least some of the pixels of the display 210 are driven based on, for example, the current value or the current value, visual information (e.g., a text, an image, or an icon) corresponding to the image data may be displayed on the display 210.

According to an embodiment, the display device 160 may further include the touch circuit 250. The touch circuit 250 may include a touch sensor 251 and a touch sensor integrated circuit (IC) 253 for controlling the touch sensor 251. The touch sensor IC 253 may detect a touch input or a hovering input to a specific location by measuring a change of a signal (e.g., voltage, an amount of light, resistance, or an amount of electric charge) for the specific location and may provide information (e.g., a location, an area, pressure, or time) about the detected touch input or the detected hovering input to the processor 120. According to an embodiment, at least a portion (e.g., the touch sensor IC 253) of the touch circuit 250 may be included as a portion of the DDI 230 or the display 210 or as a portion of another component (e.g., the auxiliary processor 123) located outside the display device 160.

According to an embodiment, the display device 160 may further include at least one sensor (e.g., a fingerprint sensor, an iris sensor, a pressure sensor, or an illumination sensor) of the sensor module 176 or a control circuit for the at least one sensor. In this case, the at least one sensor or the control circuit for the at least one sensor may be implemented by being embedding in at least a portion (e.g., the display 210 or the DDI 230) of the display device 160 or at least a portion of the touch circuit 250. For example, when the sensor module 176 embedded in the display device 160 includes a biometric sensor (e.g., a fingerprint sensor), the biometric sensor may obtain biometric information (e.g., a fingerprint image) associated with a touch input through a partial region of the display 210. For another example, when the sensor module 176 embedded in the display device 160 includes a pressure sensor, the pressure sensor may obtain pressure information about a touch input through a partial region or the entire region of the display 210. According to an embodiment, the touch sensor 251 or the sensor module 176 may be located between pixels of a pixel layer of the display 210 or above or below the pixel layer.

Figure 3:
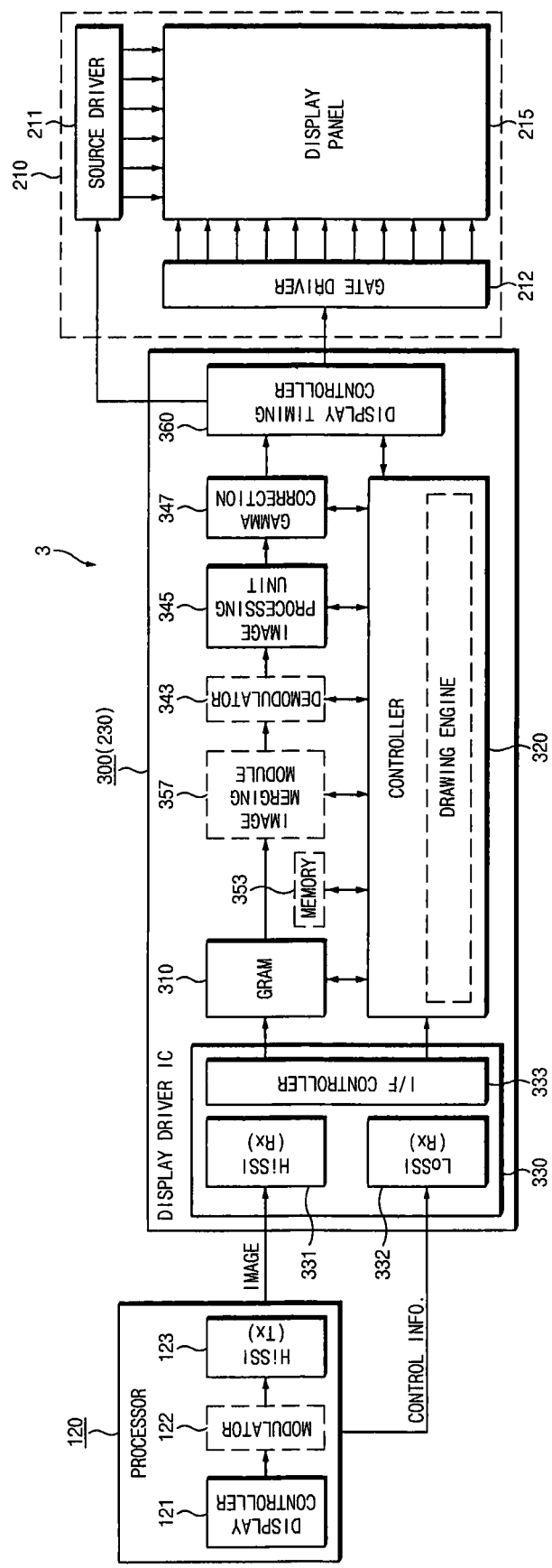
FIG. 3 is a block diagram illustrating a configuration of an electronic device including a display driver IC (DDI) according to various embodiments.

FIG. 3 is a block diagram illustrating a configuration of an electronic device including a DDI according to various embodiments.

Referring to FIG. 3, an electronic device 3 according to an embodiment may include a processor 120, a display 210, and a DDI 300. In the description of FIG. 3, a description duplicated by the description of FIG. 2 may be omitted.

The processor 130 may include a display controller 121, a modulator 122, and a transmit (Tx) high speed serial interface (HiSSI) 123.

The display controller 121 may read or generate image data stored in a memory (e.g., a memory 130 of FIG. 1). For example, the image data may represent a screen image according to any one activity of an application program. According to an embodiment, the image data may include data representing a user authentication screen of an application to which a security policy of a range of a specified level among various differential security levels (e.g., a payment application which requires the highest security level or a banking/stock application).

The modulator 122 may modulate image data transmitted from the display controller 121. The "modulation" in the specification may represent changing image data to all or some of pixel values configuring the image data. According to an embodiment, when the display controller 121 generates image data modulated from the beginning, modulation in the modulator 122 may be bypassed. According to another embodiment, when modulation of image data is not required, modulation in the modulator 122 may be bypassed.

According to an embodiment, the processor 120 may provide image data and control information described below to the DDI 300. For example, the image data may be provided to the DDI 300 via the Tx HiSSI 123. The control information may be transmitted via, for example, a Tx low speed serial interface (LoSSI) (not shown).

The DDI 300 may drive the display 210. According to an embodiment, the DDI 300 may include a graphic random access memory (GRAM) 310, a controller 320, an interface (I/F) module 330, a demodulator 343, an image processing unit 345, a gamma correction circuit 347, an (auxiliary) memory 353, an image merging module 357, and a display timing controller (hereinafter referred to as "T-con") 360.

According to an embodiment, the DDI 300 may receive image data and control information from the processor 120 via the I/F module 330. According to an embodiment, the encoded image may be received via a receive (Rx) HiSSI 331. The control information may be received via an Rx LoSSI 332.

The GRAM 310 may store image data received via the Rx HiSSI 331. A size of the image data may correspond to, but is not limited to, a storage space of the GRAM 310. The storage space of the GRAM 310 may correspond to, but is not limited to, a data size of a one-frame image of the display panel 215. According to various embodiments, the GRAM 310 may be implemented by including the (auxiliary) memory 353 described below. In this case, the storage space of the GRAM 310 may fail to correspond to the data size of the one-frame image of the display panel 215. According to various embodiments, the GRAM 310 may be referred to as a frame buffer or a buffer memory, or may be simply referred to as a memory. Hereinafter, image data stored in the GRAM 310 may be referred to as first image data or may be simply referred to as a first image.

The controller 320 may control an overall operation of the DDI 300. For example, the controller 320 may control the image merging module 357 or the demodulator 343 to bypass an operation of the image merging module 357 or the demodulator 343 if necessary in processing image data.

The I/F module 330 may include the Rx HiSSI 331, the Rx LoSSI 332, and an I/F controller 333 for controlling the Rx HiSSI 331 and the Rx LoSSI 332. According to an embodiment, an image from the processor 120 may be received via the Rx HiSSI 331. According to an embodiment, control information may be received via the Rx LoSSI 332.

The demodulator 343 may demodulate the modulated image data. For example, the demodulator 343 may perform, but is not limited to, an operation of changing or decrypting a pixel value configuring image data or filtering out (excluding) a specified pixel value.

The image processing unit 345 may correct an image to enhance image quality of the image. The image processing unit 345 may include, but is not limited to, a pixel data processing circuit, a preprocessing circuit, a gating circuit, and the like.

The gamma correction circuit 347 may determine and generate a gamma voltage of an electrical signal corresponding to image data. In general, a relationship between the electrical signal and brightness of a pixel (e.g., an organic light emitting diode (OLED)) which receives the electrical signal may fail to be linear. The gamma correction circuit 347 may determine or correct a gamma voltage of the electrical signal based on a gamma correction curve (or a look-up table (LUT) reflecting the gamma correction curve) representing a non-linear relationship between the electrical signal and the brightness of the pixel. Thus, each pixel included in a display panel 215 may display a screen intended by a user without distortion. According to an embodiment, the controller 320 may adjust and change a gamma correction curve used in the gamma correction circuit 347 or an LUT reflecting the gamma correction curve depending on an image to be displayed.

Figure 5:
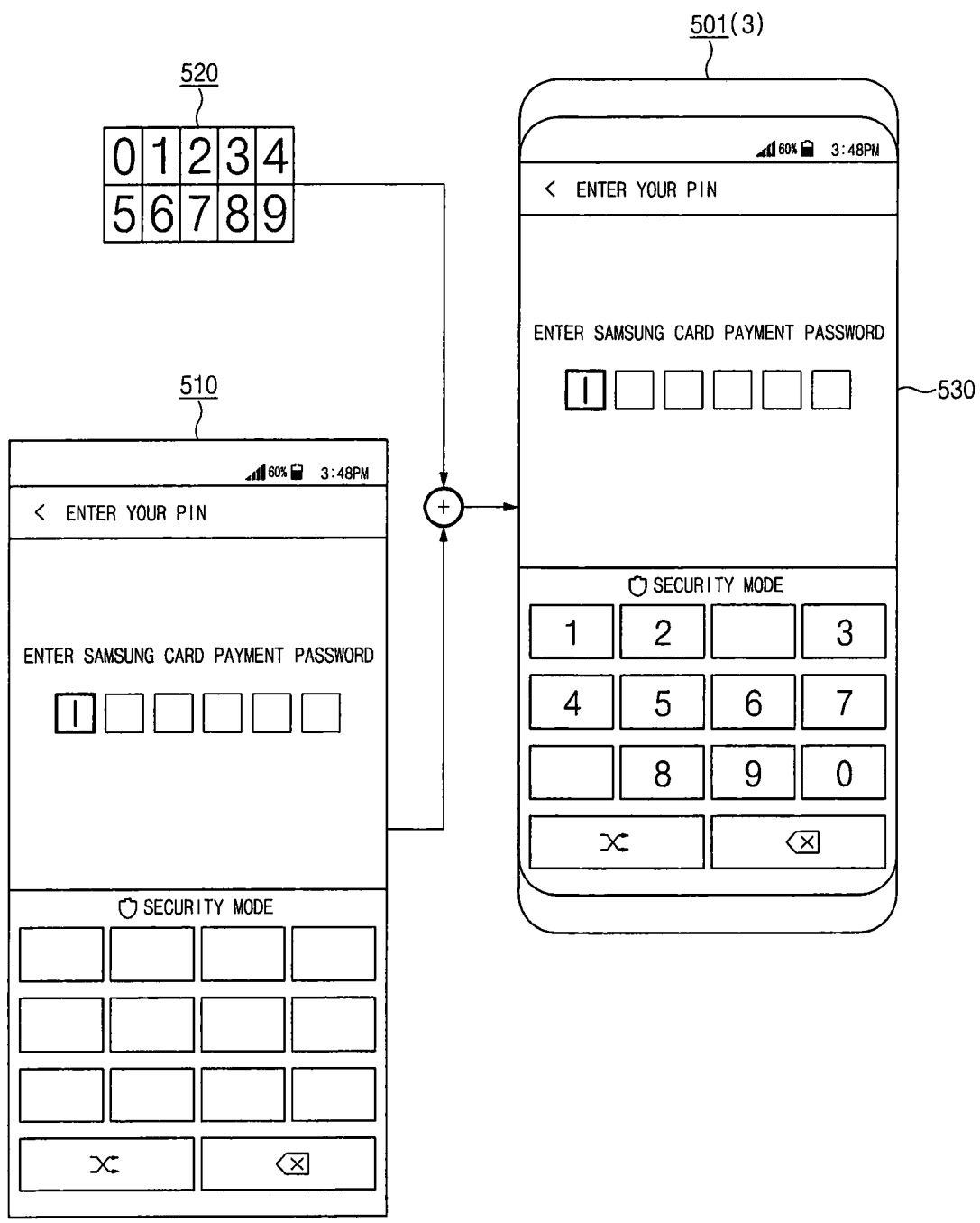
FIG. 5 is a drawing illustrating an image display method according to an aspect of the present disclosure.

The (auxiliary) memory 353 may store an image including a plurality of partial images. For example, as shown in FIG. 5, the memory 353 may store an image including individual images of numbers (an example of a partial image). According to various embodiments, a plurality of partial images may include an individual image configured with a number, a character, a symbol or a combination thereof. Hereinafter, image data stored in the memory 353 may be referred to as second image data or may be simply referred to as a second image. The partial image may be interchangeably referred to as partial image data.

The image merging module 257 may read at least one partial image from the memory 353 and may read a first image from the GRAM 310, thus merging the at least one partial image with the first image. According to an embodiment, the image merging module 357 may merge the at least one partial image with the first image based on control information received from the processor 120. The at least one partial image may be image data the control information is indicative of. The control information may include information for identifying/specifying the at least one partial image and information about a location where the at least one partial image is merged on the first image. For example, the control information may utilize a data address on the GRAM 310 and/or a data size of a partial image to specify the partial image or specify a location where the partial image merges on the first image. According to various embodiments, the image merging module 357 may be implemented as, but is not limited to, a dedicated IC chip. For example, the image merging module 357 may be implemented as a portion of the controller 320 or the image processing unit 345.

The T-con 360 may generate a signal corresponding to the received image data and may provide the generated signal to the display 210. For example, the signal may be provided to a source driver 211 and a gate driver 212 at a specified frame rate (e.g., 60 Hz) at a specified timing.

The display 210 may include the source driver 211, the gate driver 212, and the display panel 215. In addition, the display 210 may further include other related circuit components.

Each of the source driver 211 and the gate driver 212 may supply an electrical signal (e.g., V_sync or H_sync) to a scan line and a data line included in the display panel 215, under control of the T-con 360.

The display panel 215 may include millions of pixels (e.g., OLEDs). The millions of pixels included in the display panel 215 may emit light based on an electrical signal (corresponding to a pixel value) supplied from the source driver 211 and the gate driver 212. A variety of content/screens may be provided to a user by the light emitted from the pixels.

In FIG. 3, an embodiment is exemplified as the modulator 122 and the demodulator 343 corresponding to the modulator 122 are respectively included in the processor 120 and the DDI 300. In FIG. 3, an embodiment is exemplified as the memory 353 and the image merging module 357 are included in the DDI 300. However, embodiments are not limited thereto. According to various embodiments, at least one of the modulator 122, the demodulator 343, the memory 353, and the image merging module 357 may be omitted.

Hereinafter, a description will be given of an image display method according to various embodiments of the present disclosure with reference to FIGS. 4 to 13. In a description associated with FIGS. 4 to 13, for convenience of description, reference numerals used in FIG. 3 may be used.

Figure 4:
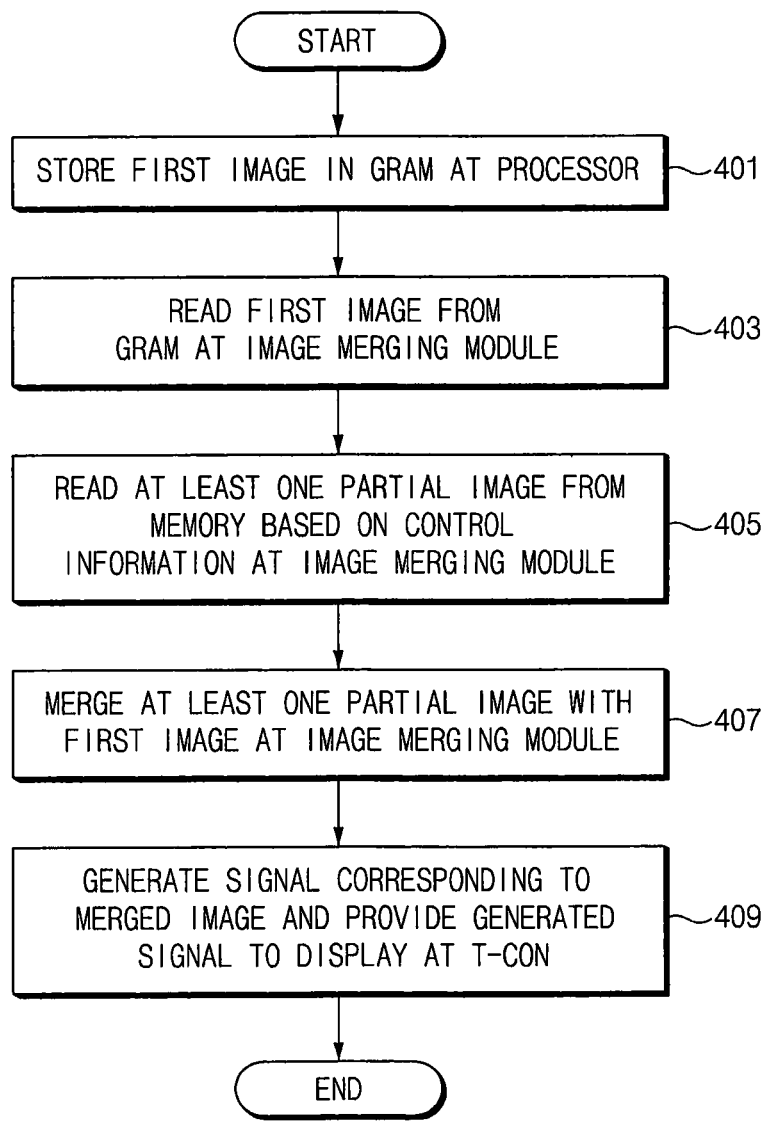
FIG. 4 is a flowchart illustrating an image display method according to an aspect of the present disclosure.

FIG. 4 is a flowchart illustrating an image display method according to an aspect of the present disclosure.

Referring to FIG. 4, the image display method according to an embodiment may include operations 401 to 409. Operations 401 to 409 may be performed by, for example, an electronic device 101 shown in FIG. 1 or an electronic device 3 shown in FIG. 3.

In operation 401, a processor 120 may store a first image in a GRAM 310 included in a DDI 300 and may transmit control information to the DDI 300.

According to an embodiment, the first image may include a user authentication screen of an application (e.g., a mobile payment application or a mobile banking application) to which a specified security policy is applied. A number, a character, or a symbol provided to enter a personal identification number (PIN) or a password may fail to be included in the first image.

According to an embodiment, the control information may include information for specifying at least one partial image in a second image stored in a memory 353 and information about a location where the at least one image is merged on the first image. The second image stored in the memory 353 may include an individual image (a partial image) of a number, a character, or a symbol provided to enter a PIN or a password.

In operation 403, an image merging module 357 included in the DDI 300 may read the first image from the GRAM 310.

In operation 405, the image merging module 357 may read at least one partial image from the memory 353 based on control information received from the processor 120.

In operation 407, the image merging module 357 may merge the at least one partial image with the first image based on the control information received from the processor 120. The merged image may be provided to a T-con 360 through constant processing.

In operation 409, the T-con 360 may generate a signal corresponding to the merged image and may provide the merged signal to a display 210.

Although not illustrated in FIG. 4, the display 210 may display the merged image.

FIG. 5 is a drawing illustrating an image display method according to an aspect of the present disclosure.

Referring to FIG. 5, a processor 120 of an electronic device 501 (e.g., an electronic device 3 of FIG. 3) may generate a first image 510 and may store the generated first image 510 in a GRAM 310. For example, the first image 510 may include a user authentication screen of an application (e.g., a mobile payment application or a mobile banking application) to which a specified security policy is applied. A number, a character, or a symbol provided to enter a PIN or a password may fail to be included in the first image 510.

An image merging module 357 included in a DDI 300 may read the first image 510 from the GRAM 310 and may read partial images 520 control information is indicative of from a memory 353. The partial images 520 may include individual images of numbers provided to enter a PIN or a password. The image merging module 357 may merge the partial images 520 with the first image 510 based on the control information. The control information may include information for specifying the partial images 520 and information about a location where the partial images 520 are merged on the first image 510.

A result image 530 in which the first image 510 and the partial images 520 are merged with each other may be processed by an image processing unit 345 and a gamma correction circuit 347. The DDI 300 may generate a signal corresponding to the merged image and may provide the generated image to a display 210. The result image 530 may be displayed on the display 210 of the electronic device 501.

According to various embodiments, in response to selection (e.g., touch) of a button included in the result image 530, the DDI 300 may provide a constant graphic effect, such as color inversion of the selected button, itself. A user may recognize the selection of the button through the graphic effect.

Figure 6:
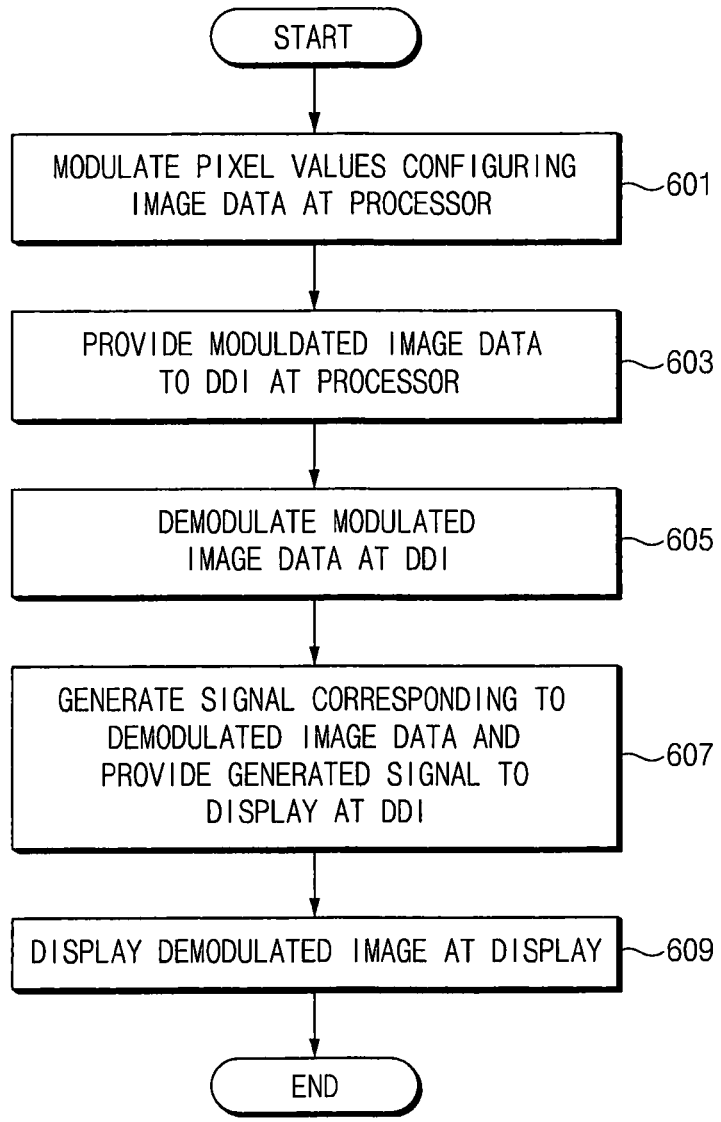
FIG. 6 is a flowchart illustrating an image display method according to another aspect.

FIG. 6 is a flowchart illustrating an image display method according to another aspect.

Referring to FIG. 6, the image display method according to an embodiment may include operations 601 to 609. Operations 601 to 609 may be performed by an electronic device 101 shown in FIG. 1 or an electronic device 3 shown in FIG. 3.

In operation 601, a processor 120 may modulate pixel values configuring image data in a specified scheme. For example, the image data may include a user authentication screen of an application (e.g., a mobile payment application or a mobile banking application) to which a specified security policy is applied. According to various embodiments, when the processor 120 generates image data modulated from the beginning, operation 601 may be omitted.

In operation 603, the processor 120 may provide the image data modulated in operation 601 to a DDI 300. The modulated image data may be stored in a GRAM 310 included in the DDI 300.

In operation 605, a demodulator 343 included in the DDI 300 may perform demodulation of the modulated image data. Alternatively, the demodulation may be indirectly performed by a gamma correction circuit 347. A demodulation scheme in the DDI 300 may correspond to the modulation scheme in operation 601. According to an embodiment, the demodulation scheme may be preset in the demodulator 343 or may be set by obtaining information about the demodulation scheme from the processor 120.

In operation 607, a T-con 360 included in the DDI 300 may generate a signal corresponding to the demodulated image data and may provide the generated signal to a display 210.

In operation 609, a source driver 211 and a gate driver 212 included in the display 210 may display the demodulated image on a display panel 215 using the signal.

Figure 7:
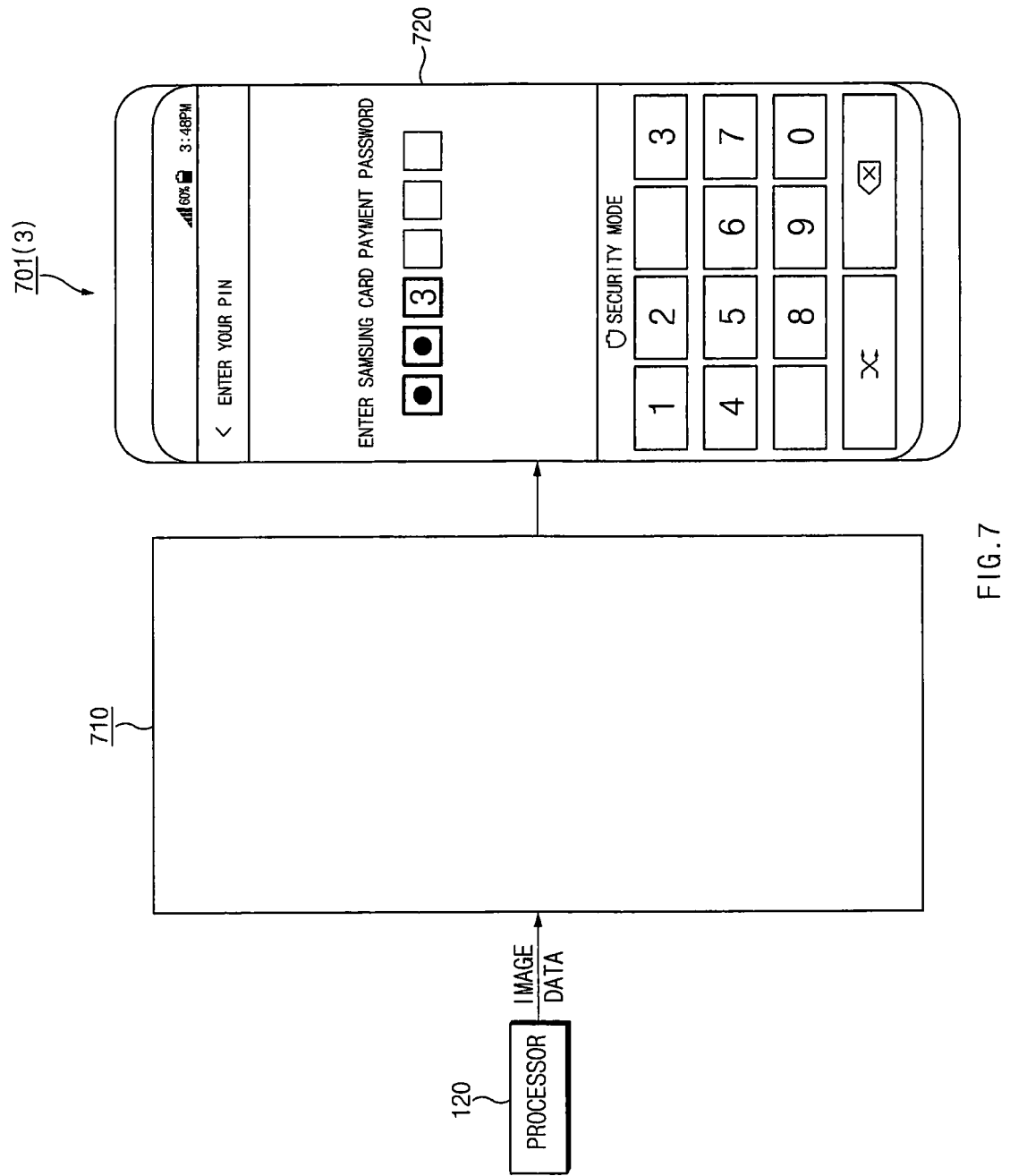
FIG. 7 is a drawing illustrating an image display method according to another aspect of the present disclosure.

FIG. 7 is a drawing illustrating an image display method according to another aspect of the present disclosure.

Referring to FIG. 7, a processor 120 of an electronic device 701 (e.g., an electronic device 3 of FIG. 3) may store modulated image data 710 in a GRAM 310 included in a DDI 300. For example, the modulated image data 710 may include a user authentication screen of an application (e.g., a mobile payment application or a mobile banking application) to which a specified security policy is applied.

The modulated image data 710 stored in the GRAM 310 may be modulated in various schemes. When the modulated image data 710 stored in the GRAM 310 is displayed on a display of the third party without being demodulated, it may become a meaningless image which is not visually identified by a user.

A demodulator 343 (or a gamma correction circuit 347) included in the DDI 300 may demodulate the modulated image data 710. A user authentication screen 720 capable of being visually identified by the user may be displayed on a display of the electronic device 701 by the demodulated image data.

Figure 8:
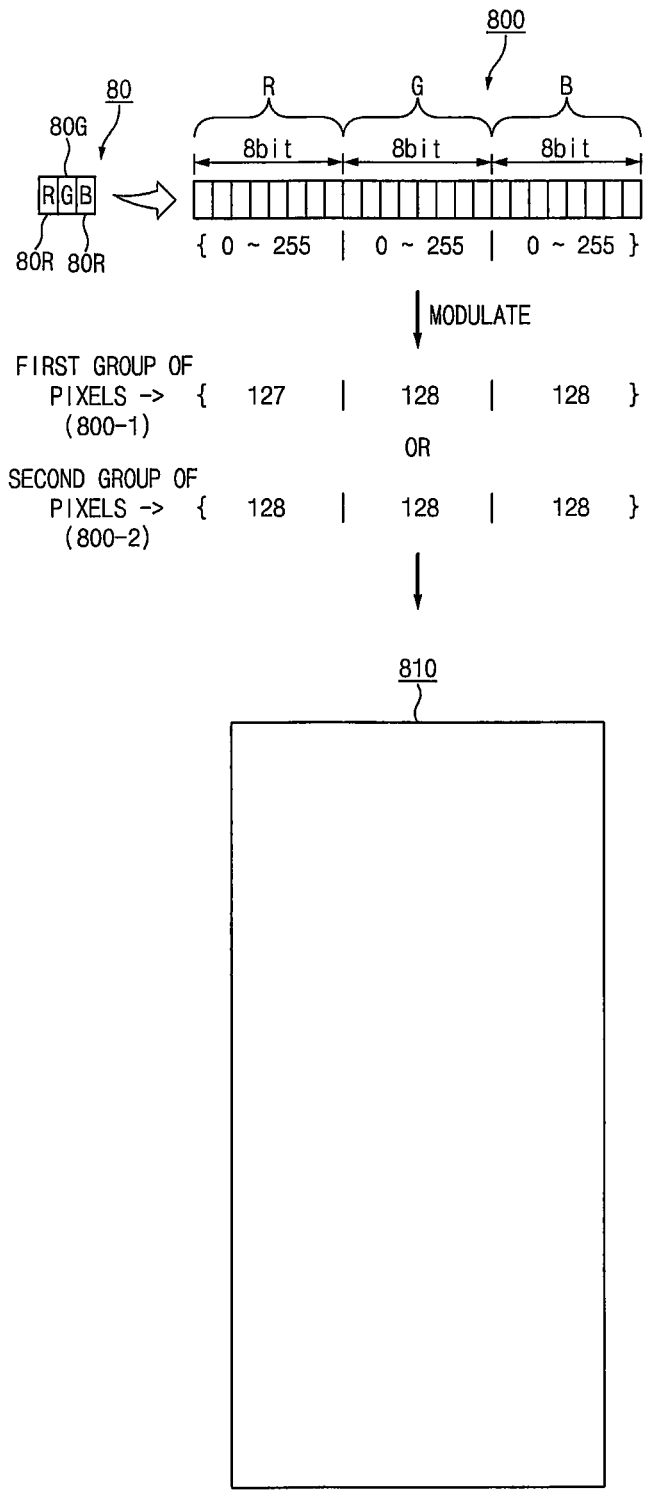

FIG. 8 is a drawing illustrating a modulation method according to an embodiment.

Referring to FIG. 8, a pixel 80 capable of being included in a plurality of pixels included in a display panel 215 is shown. For example, the pixel 80 may include a sub-pixel 80R for generating a red light, a sub-pixel 80G for generating a green light, and a sub-pixel 80B for generating a blue light. A pixel value 800 corresponding to a signal provided to the pixel 80 may include, for example, a 8-bit digital value (having a value of 0-255 in the decimal system) provided to the sub-pixel 80R, a 8-bit digital value (having a value of 0-255 in the decimal system) provided to the sub-pixel 80G, and a 8-bit digital value (having a value of 0-255 in the decimal system) provided to the sub-pixel 80B.

A processor 120 may classify image data including the plurality of pixels 800 as a first group of pixel values 800-1 of less than a specified threshold or a second group of pixel values 800-2 of greater than or equal to the specified threshold.

For example, a pixel value in which the sum of digital values for the sub-pixels 80R, 80G, and 80B is less than 384 (=128*3) in the decimal system may be classified as, but is not limited to, the first group of pixel values 800-1. A pixel value in which the sum of digital values for the sub-pixels 80R, 80G, and 80B is greater than or equal to 384 in the decimal system may be classified as, but is not limited to, the second group of pixel values 800-2. Alternatively, a pixel value in which the sum of digital values for the sub-pixels 80R, 80G, and 80B is less than 128 in the decimal system may be classified as, but is not limited to, the first group of pixel values 800-1. A pixel value in which the sum of digital values for the sub-pixels 80R, 80G, and 80B is greater than or equal to 128 in the decimal system may be classified as, but is not limited to, the second group of pixel values 800-2.

The image data may include a user authentication screen of an application (e.g., a mobile payment application or a mobile banking application) to which a specified security policy is applied. According to the above classification, at least a portion of the first group of pixels values 800-1 may configure a number, a character, or a symbol provided to enter a password or a PIN, and at least a portion of the second group of pixel values 800-2 may configure a background of the user authentication screen.

According to an embodiment, the processor 120 may generate modulated image data 810 by changing the first group of pixel values 800-1 to a first value and changing the second group of pixel values 800-2 to a second value. The processor 120 may provide the modulated image data 810 to a DDI 300. The modulated image data 810 may be stored in a GRAM 310. The first value and the second value may be close to each other within a specified range. For example, the first value (e.g., {127|128|128}) and the second value (e.g., {128|128|128}) may be substantially digital values and may differ from each other by "1". Thus, for example, when the modulated image data 810 stored in the GRAM 310 is output on a display of the third party while not demodulated, the first value and the second value may be difficult to be visually identified due to similarity between the first value and the second value.

According to an embodiment, a demodulator 343 included in the DDI 300 may demodulate the modulated image data by changing the first group of pixel values 800-1 from the first value (e.g., {127|128|128}) to a third value (e.g., {0|0|0}) and changing the second group of pixel values 800-2 from the second value (e.g., {128|128|128}) to a fourth value (e.g., {255|255|255}). The demodulated image may be displayed on a display 210. In this case, a difference between the third value (e.g., {0|0|0}) and the fourth value (e.g., {255|255|255}) may be set greater than a difference between the first value and the second value. The difference between the third value and the fourth value may be set to visually identify the third value and the fourth value.

In FIG. 8, an embodiment is exemplified as the pixel values configuring the image data may be classified into the two groups. However, embodiments are not limited thereto.

For example, the pixel values may be classified into three groups or groups of greater than or equal to the three groups.

Figure 9:
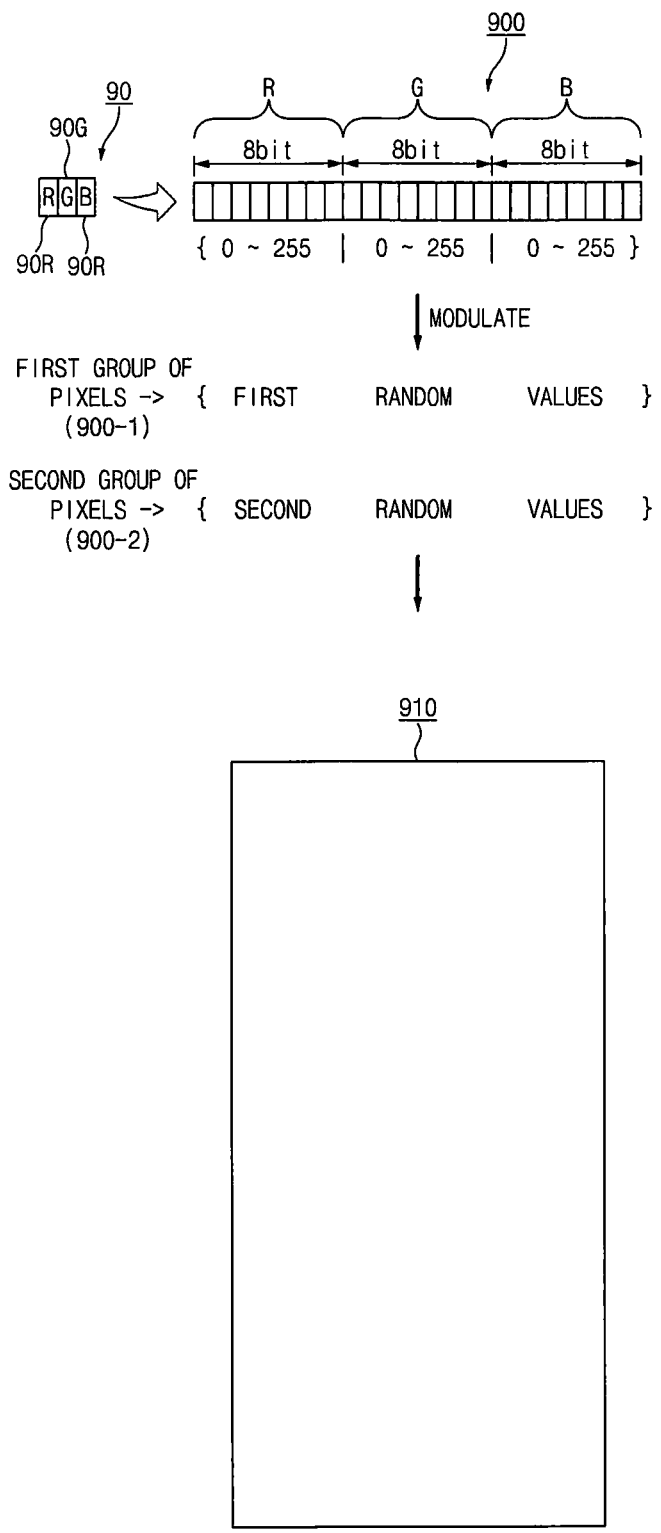

FIG. 9 is a drawing illustrating a modulation method according to another embodiment.

Referring to FIG. 9, a pixel 90 capable of being included in a plurality of pixels included in a display panel 215 is shown. For example, the pixel 90 may include a sub-pixel 90R for generating a red light, a sub-pixel 90G for generating a green light, and a sub-pixel 90B for generating a blue light. A pixel value 900 corresponding to a signal provided to the pixel 90 may include, for example, a 8-bit digital value (having a value of 0-255 in the decimal system) provided to the sub-pixel 90R, a 8-bit digital value (having a value of 0-255 in the decimal system) provided to the sub-pixel 90G, and a 8-bit digital value (having a value of 0-255 in the decimal system) provided to the sub-pixel 90B.

A processor 120 may classify image data including the plurality of pixel values 900 as a first group of pixel values 900-1 of less than a specified threshold or a second group of pixel values 900-2 of greater than or equal to the specified threshold. The criterion of classifying the first group of pixel values 900-1 and the second group of pixel values 900-2 may be the same as that described in FIG. 8.

According to an embodiment, the processor 120 may generate modulated image data 910 by changing the first group of pixel values 900-1 to a first random value and changing the second group of pixel values 900-2 to a second random value. The processor 120 may provide the modulated image data 910 to a DDI 300. The modulated image data 910 may be stored in a GRAM 310.

According to an embodiment, the first random value and the second random value may be selected within different ranges, respectively. For example, the random value may be selected within a first range, and the second random value may be selected in a second range. The first range and the second range may be mutually exclusive. For example, the first range may have, but is not limited to, a value of greater than or equal to 0 and less than or equal to $2^{23}-1$ in the decimal system, and the second range may have, but is not limited to, a value of greater than or equal to $2^{23}$ and less than or equal to $2^{24}-1$ in the decimal system. For another example, the first range may have, but is not limited to, an odd value of greater than or equal to 0 and less than or equal to $2^{24}-1$ in the decimal system, and the second range may have, but is not limited to, an even value of greater than or equal to 0 and less than or equal to $2^{24}-1$ in the decimal system. Thus, for example, when the modulated image data 910 stored in the GRAM 310 is output on a display of the third party while not demodulated, an image incapable of being identified due to the random values may be displayed.

According to an embodiment, a demodulator 343 included in the DDI 300 may demodulate the modulated image data 910 by changing the first group of pixel values 900-1 within the first range from the first random value to a third value (e.g., {0|0|0}) and changing the second group of pixel values 900-2 within the second range from the second random value to a fourth value (e.g., {255|255|255}). The demodulated image 910 may be displayed on a display 210. A difference between the third value and the fourth value may be set to visually identify the third value and the fourth value.

According to another embodiment, the DDI 300 may demodulate the modulated image data 910 without using the demodulator 343. For example, a controller 320 of the DDI 300 may allow the gamma correction circuit 347 to generate a signal corresponding to the first group of pixel values 900-1 and a signal corresponding to the second group of pixel values 900-2 to be distinguished from each other by adjusting a gamma correction curve of a gamma correction circuit 347.

For example, at a time when modulation is performed by the processor 120, the first group of pixel values 900-1 may be changed to a random value within a first range (e.g., a range of greater than or equal to 0 and less than or equal to $2^{23}-1$). The second group of pixel values 900-2 may be changed to a random value within a second range (e.g., a range of greater than or equal to $2^{23}$ and less than or equal to $2^{24}-1$). In this case, the controller 320 of the DDI 300 may adjust the gamma correction curve to make a difference in a level of a gamma voltage with respect to a $2^{23}$ pixel value. For example, the controller 320 may adjust the gamma correction curve such that a gamma voltage (or a supply voltage) of the first group of pixel values 900-1 changed to the random value within the first range (e.g., a range of greater than or equal to 0 and less than or equal to $2^{23}-1$) becomes 3.0 V and such that a gamma voltage of the second group of pixel values 900-2 changed to the random value within the second range (e.g., a range of greater than or equal to $2^{23}$ and less than or equal to $2^{24}-1$) becomes 4.6 V. Thus, the first group of pixel values 900-1 and the second group of pixel values 900-2 may be distinguished from each other on a real display screen.

Figure 10:
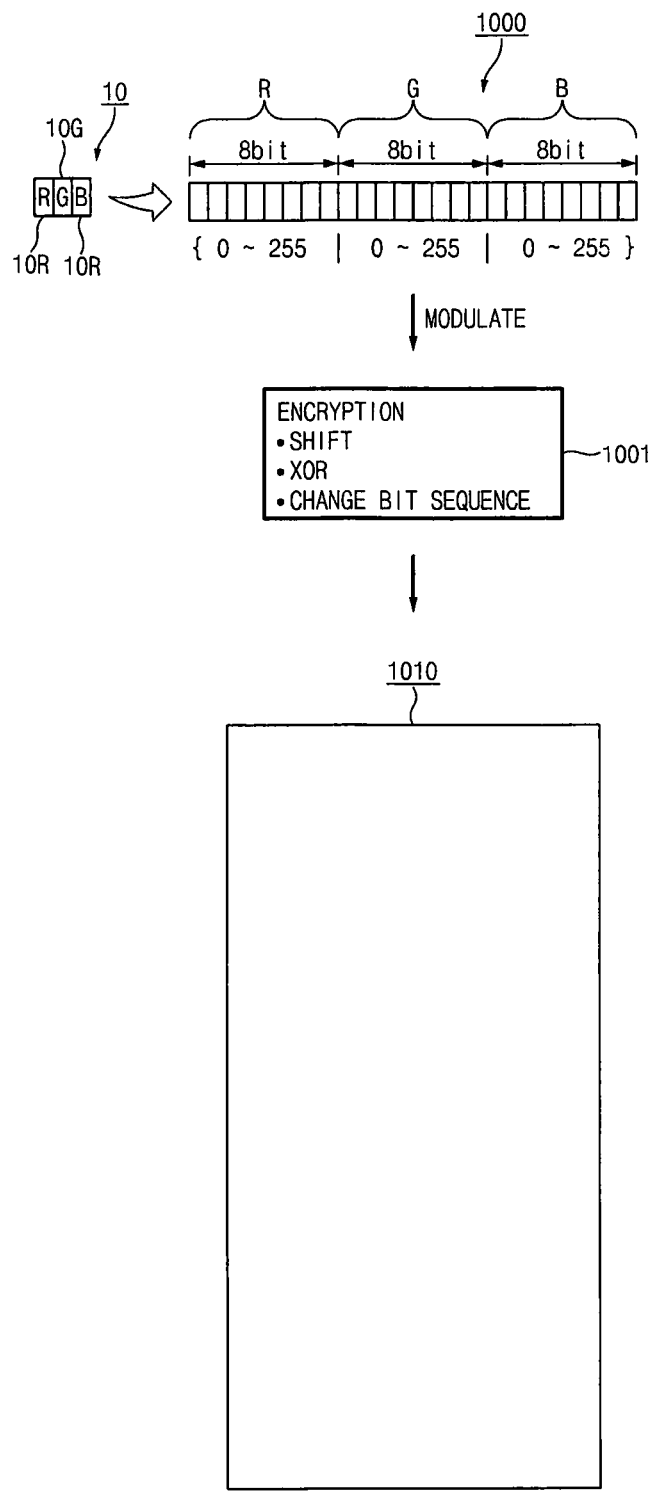

FIG. 10 is a drawing illustrating a modulation method according to another embodiment.

Referring to FIG. 10, a pixel 10 capable of being included in a plurality of pixels included in a display panel 215 is shown. For example, the pixel 10 may include a sub-pixel 10R for generating a red light, a sub-pixel 10G for generating a green light, and a sub-pixel 10B for generating a blue light. A pixel value 1000 corresponding to a signal provided to the pixel 10 may be represented with a 24-bit digital value.

According to an embodiment, a processor 120 may modulate image data by encrypting (1001) a plurality of pixels configuring the image data. For example, the processor 120 may encrypt (1001) image data based on a key shared with a demodulator 343 included in a DDI 300.

The processor 120 may shift, for example, but is not limited to, each pixel (each digital value) configuring image data by the number of times represented by the key and in a direction represented by the key, may XOR a digital value of the key and the pixel value, or may change a bit sequence of a digital value based on the key. The encrypted or modulated image data 1010 may be stored in a GRAM 310. Thus, for example, when the modulated image data 1010 stored in the GRAM 310 is output on a display of the other party while not demodulated, an image incapable of being identified due to encrypted pixel values may be displayed.

According to an embodiment, the demodulator 343 included in the DDI 300 may perform demodulation of the modulated image data 1010 in a scheme corresponding to the encryption of the processor 120. A screen corresponding to image data before the encryption may be output on a display 210 through the demodulation.

Figure 11:
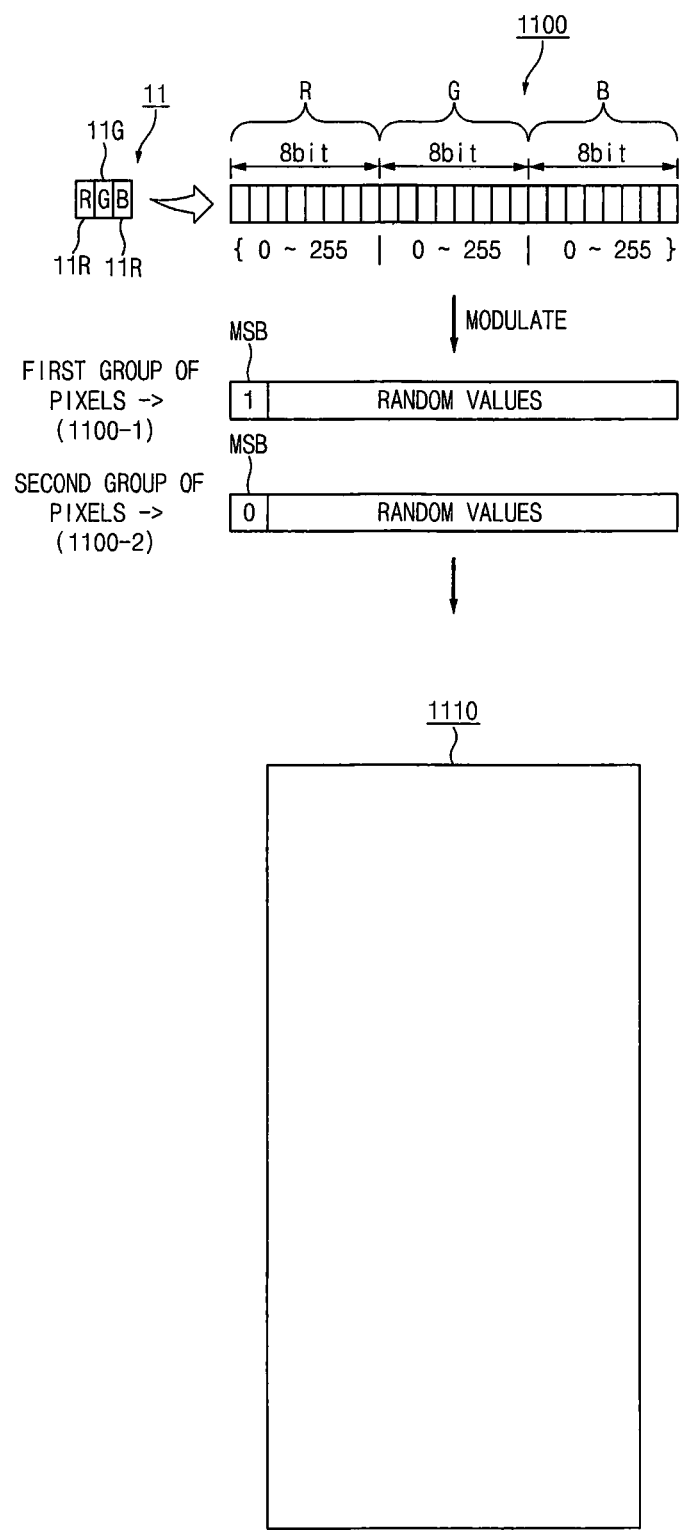

FIG. 11 is a drawing illustrating a modulation method according to another embodiment.

Referring to FIG. 11, a pixel 11 capable of being included in a plurality of pixels included in a display panel 215 is shown. For example, the pixel 11 may include a sub-pixel 11R for generating a red light, a sub-pixel 11G for generating a green light, and a sub-pixel 11B for generating a blue light. A pixel value 1100 corresponding to a signal provided to the pixel 11 may be represented with a 24-bit digital value.

A processor 120 may classify image data including the plurality of pixel values 1100 as a first group of pixel values 1100-1 of less than a specified threshold or a second group of pixel values 1100-2 of greater than or equal to the specified threshold. The criterion of classifying the first group of pixel values 1100-1 and the second group of pixel values 1100-2 may be the same as that described in FIG. 8.

According to an embodiment, the processor 120 may change the first group of pixel values 1100-1 and the second group of pixel values 1100-2 to random values, respectively. The processor 120 may generate modulated image data 1110 by changing a most significant bit (MSB) of the first group of pixel values 1100-1 to a first digital value (e.g., '1') and changing an MSB of the second group of pixel values 1100-2 to a second digital value (e.g., '0'). The processor 120 may provide the modulated image data 1110 to a DDI 300. The modulated image data 1110 may be stored in a GRAM 310. Thus, for example, when the modulated image data 1110 stored in the GRAM 310 is output on a display of the third party while not demodulated, an image incapable of being identified due to the random values may be displayed. According to various embodiments, the processor 120 may utilize a least significant bit (LSB) rather than the MSB.

According to an embodiment, a demodulator 343 included in the DDI 300 may read the modulated image data 1110 stored in the GRAM 310. The demodulator 343 may demodulate the modulated image data 1110 by changing the first group of pixel values 1100-1, an MSB of which is the first digital value, to a third value (e.g., {0|0|0}) and changing the second group of pixel values 1100-2, an LSB or MSB of which is the second digital value, to a fourth value (e.g., {255|255|255}). The demodulated image 1100 may be displayed on a display 210. A difference between the third value and the fourth value may be set to visually identify the third value and the fourth value.

Figure 12A:
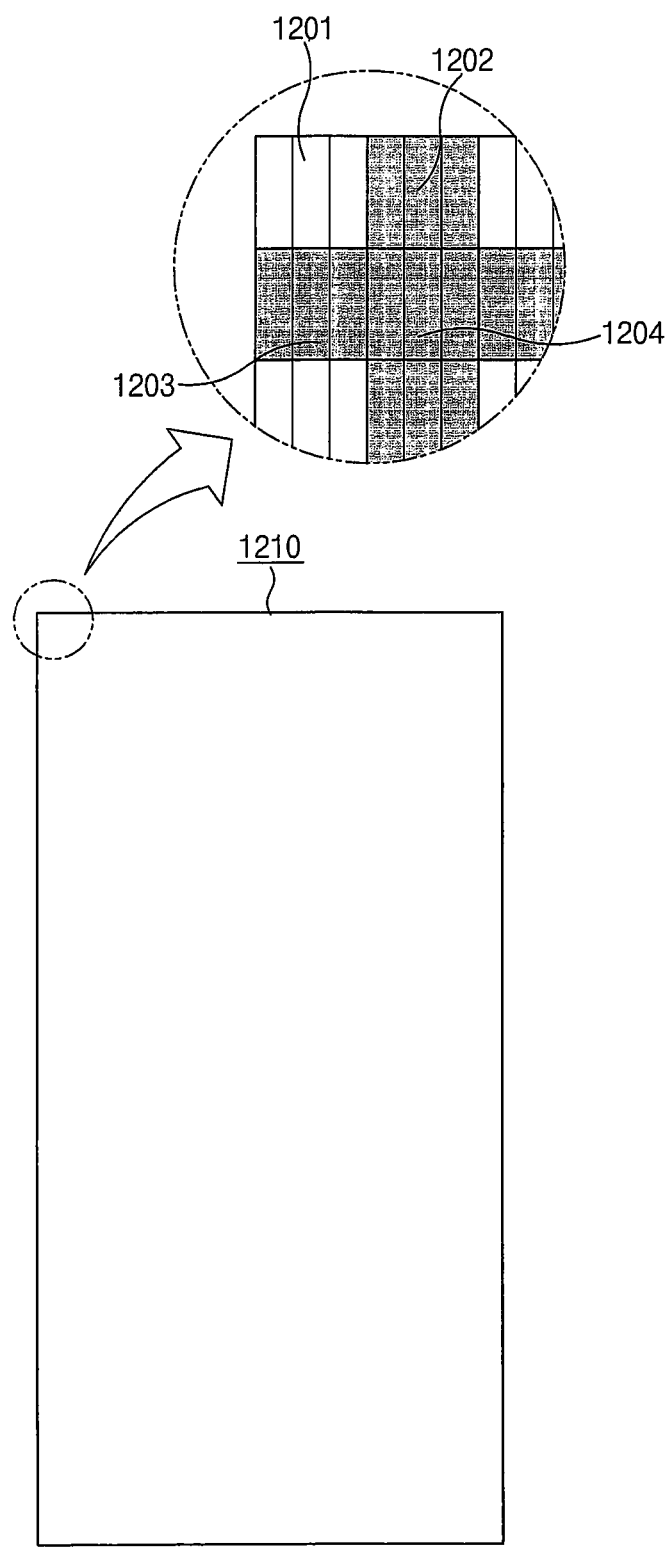

FIG. 12A is a drawing illustrating a modulation method according to another embodiment.

Referring to FIG. 12A, image data 1210 configured with a plurality of pixel values is shown. The image data 1210 shown in FIG. 12A may correspond to a pixel layout of a real display panel 215. According to an embodiment, each of pixel values 1201 to 1204 may be represented as a 24-bit digital value.

According to an embodiment, a processor 120 may modulate image data by changing a pixel value of a specified rate among pixel values configuring the image data to a random value. For example, in case of the image data 1210, ¾ (75%) pixel values may be changed to, but is not limited to, a random value. As shown, an initially intended value may be maintained in the pixel value 1201, and each of the pixel values 1202 to 1204 may be changed to a random value. In the entire image data 1210, the four pixel values 1201 to 1204 may be repeated in a similar pattern. The modulated image data 1210 may be stored in a GRAM 310. Thus, for example, when the modulated image data 1210 stored in the GRAM 310 is output on a display of the third party while not demodulated, an image incapable of being substantially identified due to pixel values, each of which has a random value, may be displayed.

According to an embodiment, a demodulator 343 included in a DDI 300 may demodulate the modulated image data 1210 by filtering out a pixel value (e.g., the pixel value 1202, 1203, or 1204) having a random value among pixel values configuring the image data 1210 based on the repeated pattern. A screen based on the demodulated image data may fail to strictly provide a seamless image. However, a number, a character, and a symbol may be sufficiently distinguished from a background visually by a user on a screen based on the demodulated image data.

Figure 12B:
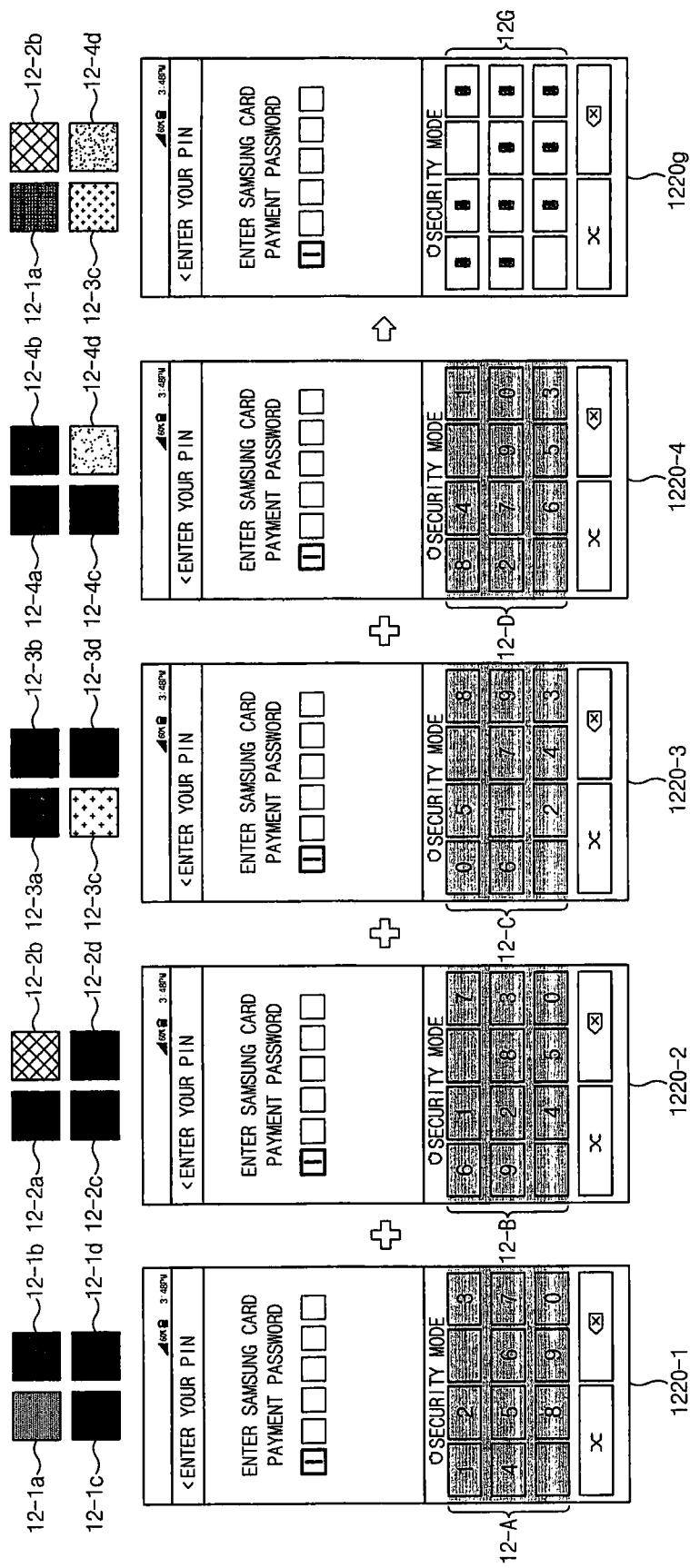
Figure 12C:
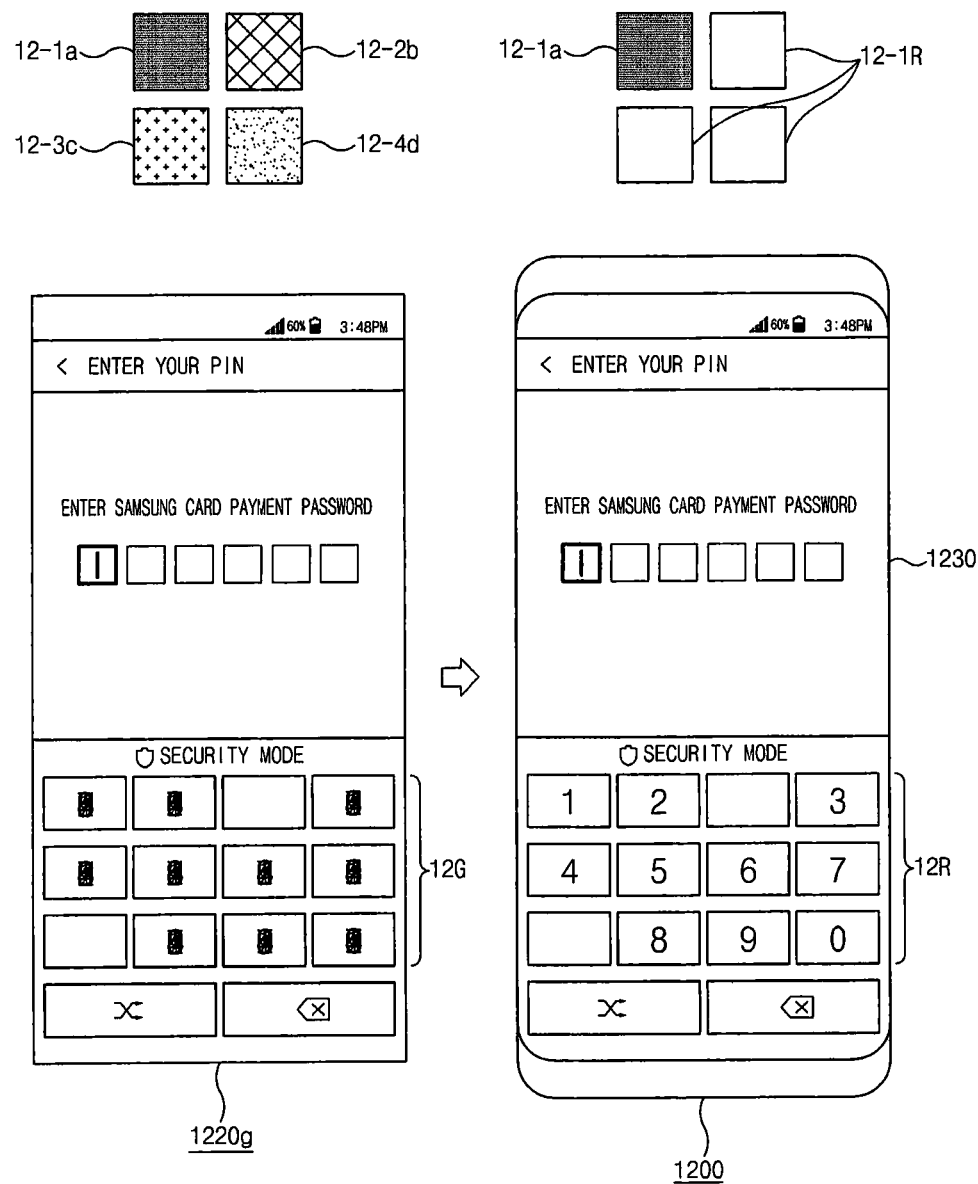
Figure 14:
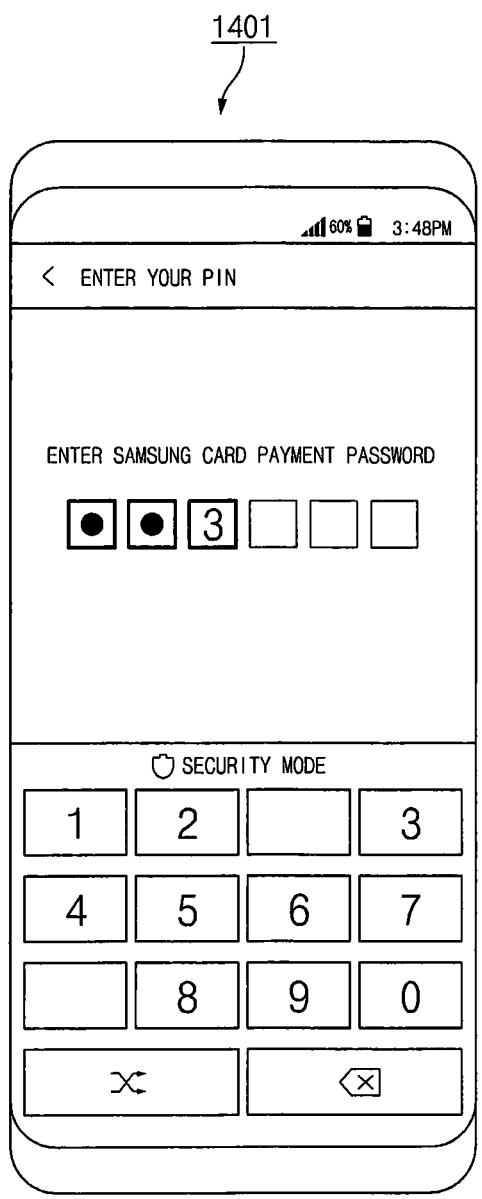
FIG. 14 is a drawing illustrating a PIN authentication screen by a mobile payment application or a mobile banking application.

FIGS. 12B and 12C are drawings illustrating a modulation method according to another embodiment.

According to an embodiment, a processor 120 may modulate image data by overlaying a plurality of images. Modulation by the processor 120 is schematically described with reference to FIG. 12B. Referring to FIG. 12B, the processor 120 may generate a modulated image 1220g by overlaying a first image 1220-1, a second image 1220-2, a third image 1220-3, and a fourth image 1220-4. The modulated image 1220g may be stored in a GRAM 310 included in a DDI 300.

According to an embodiment, the processor 120 may generate the first image 1220-1, the second image 1220-2, the third image 1220-3, and the fourth image 1220-4. The first image 1220-1, the second image 1220-2, the third image 1220-3, and the fourth image 1220-4 may include a security area 12-A, a security area 12-B, a security area 12-C, and a security area 12-D, respectively, each of which has a numeric image provided to enter a PIN.

According to an embodiment, the security area 12-A included in the first image 1220-1 may be configured with a plurality of pixel values. For example, four pixels 12-1a, 12-1b, 12-1c, and 12-1d may be repeatedly located on the security area 12-A. For example, a pixel value X may be assigned to the pixel 12-1a located at the left top, and a random value may be assigned to each of the pixels 12-1b, 121-c, and 12-1d. The pixel value X may be understood as a value configuring a numeric image included in the security area 12-A. Thus, for example, when the four pixels 12-1a, 12-1b, 12-1c, and 12-1d configures a portion of a background of the security area 12-A, a random value may be assigned to the pixel 12-1a.

Similarly, four pixels 12-2a, 12-2b, 12-2c, and 12-2d may be repeatedly located on the security area 12-B included in the second image 1220-2. For example, a pixel value Y may be assigned to the pixel 12-2b located at the right top, and a random value may be assigned to each of the pixels 12-2a, 12-2c, and 12-2d. The pixel value Y may be understood as a value configuring a numeric image included in the security area 12-B. Thus, for example, when the four pixels 12-2a, 12-2b, 12-2c, and 12-2d configures a portion of a background of the security area 12-B, a random value may be assigned to the pixel 12-2b.

Similarly, four pixels 12-3a, 12-3b, 12-3c, and 12-3d may be repeatedly located on the security area 12-C included in the third image 1220-3. For example, a pixel value Z may be assigned to the pixel 12-3c located at the left bottom, and a random value may be assigned to each of the pixels 12-3a, 12-3b, and 12-3d. The pixel value Z may be understood as a value configuring a numeric image included in the security area 12-C. Thus, for example, when the four pixels 12-3a, 12-3b, 12-3c, and 12-3d configures a portion of a background of the security area 12-C, a random value may be assigned to the pixel 12-3c.

Similarly, four pixels 12-4a, 12-4b, 12-4c, and 12-4d may be repeatedly located on the security area 12-D included in the fourth image 1220-4. For example, a pixel value W may be assigned to the pixel 12-4d located at the right bottom, and a random value may be assigned to each of the pixels 12-4a, 12-4b, and 12-4c. The pixel value W may be understood as a value configuring a numeric image included in the security area 12-D. Thus, for example, when the four pixels 12-4a, 12-4b, 12-4c, and 12-4d configures a portion of a background of the security area 12-D, a random value may be assigned to the pixel 12-4d.

According to an embodiment, the processor 120 may generate modulated image data 1220g by overlaying the first to fourth images 1220-1 to 1220-4 or the security areas 12-A to 12-D of the first to fourth images 1220-1 to 1220-4. Thus, when a security area 12G has a structure where four pixels are repeatedly located, the four pixels may be configured with the left-top pixel 12-1a from the security area 12A, the right-top pixel 12-2b from the security area 12B, the left-bottom pixel 12-3c from the security area 12C, and the right-bottom pixel 12-4d from the security area 12D.

As shown in FIG. 12B, layouts of numeric images may differ from each other on the security areas 12-A to 12-D. Thus, an overlaid numeric image (e.g., an overlay image) which is difficult to be substantially identified may be included in the security area 12G included in the modulated image data 1220g. Thus, for example, when the modulated image data 1220g stored in a GRAM 310 is output on a display of the third party while not demodulated, the "overlay image" included in the modulated image data 1220g may be difficult to be visually identified by a user.

According to an embodiment, a demodulator 343 included in a DDI 330 may demodulate the modulated image data 1220g. Modulation by the processor 120 is schematically described with reference to FIG. 12C. Referring to FIG. 12C, the demodulator 343 included in the DDI 300 may select only some of a plurality of pixel values configuring the modulated image data 1220g.

For example, when pixels implementing the security area 12G are configured with the left-top pixel 12-la from the security area 12A, the right-top pixel 12-2b from the security area 12B, the left-bottom pixel 12-3c from the security area 12C, and the right-bottom pixel 12-4d from the security area 12D, the demodulator 343 may select the left-top pixel 12-a (the pixel value X) from the security area 12A and may filter out the pixel values Y, Z, and W of the other pixels 12-2b, 12-3c, and 12-4d. A specified pixel value 12-R (e.g., the same pixel value as a background pixel value) may be assigned to the pixels 12-2b, 12-3c, and 12-4d. As such, the demodulator 343 may demodulate the modulated image data 1220g. A screen 1230 based on the demodulated image data may be displayed on a display of an electronic device 1200. The security area 12G on the screen 1230 may fail to provide a seamless image in the strict sense. However, each number configured with the pixel 12-a on the security area 12G may be sufficiently distinguished from a background visually by the user.

FIG. 13 is a drawing illustrating a modulation method according to another embodiment.

Referring to FIG. 13, a processor 120 of an electronic device 1301 (e.g., an electronic device 3 of FIG. 3) may store modulated image data 1310 in a GRAM 310 included in a DDI 300. For example, the modulated image data 1310 may include a user authentication screen of a mobile payment application or a mobile banking application.

According to an embodiment, the modulated image data 1310 may include "overlay images" provided to enter a PIN. The "overlay images" included in buttons 1301 to 1312 in the modulated image data 1310 may be images on which '0' to '9' individual numeric images to which different pixel values are assigned are overlaid. In FIG. 13, an embodiment is exemplified as the "overlay image" is included in each of the buttons 1301 to 1312. However, embodiments are not limited thereto. For example, the "overlay image" may be included in at least one of the buttons 1301 to 1312. The "overlay image" may be an image which is impossible to substantially identify a number as shown in FIG. 13. When the modulated image data 1310 is displayed on a display of the third party while not demodulated, the "overlay image" included in the modulated image data 1310 may be difficult to be identified visually by a user.

For example, a pixel value (e.g., a gray scale) of an individual numeric image configuring the "overlay image" may be, but is not limited to, Table 1 below.

TABLE 1

|  | '1' | '2' | '3' | '4' | '5' | '6' | '7' | '8' | '9' | '0' |
|---|---|---|---|---|---|---|---|---|---|---|
| Button 1301 | 127 | 126 | 125 | 124 | 123 | 122 | 128 | 129 | 130 | 131 |
| Button 1302 | 132 | 127 | 125 | 124 | 123 | 122 | 128 | 129 | 130 | 131 |
| Button 1303 | 132 | 126 | 125 | 124 | 123 | 122 | 128 | 129 | 130 | 131 |
| Button 1304 | 132 | 126 | 127 | 124 | 123 | 122 | 128 | 129 | 130 | 131 |
| Button 1305 | 132 | 126 | 125 | 127 | 123 | 122 | 128 | 129 | 130 | 131 |
| Button 1306 | 132 | 126 | 125 | 124 | 127 | 122 | 128 | 129 | 130 | 131 |
| Button 1307 | 132 | 126 | 125 | 124 | 123 | 127 | 128 | 129 | 130 | 131 |
| Button 1308 | 132 | 126 | 125 | 124 | 123 | 122 | 127 | 129 | 130 | 131 |
| Button 1309 | 132 | 126 | 125 | 124 | 123 | 122 | 128 | 129 | 130 | 131 |
| Button 1310 | 132 | 126 | 125 | 124 | 123 | 122 | 128 | 127 | 130 | 131 |
| Button 1311 | 132 | 126 | 125 | 124 | 123 | 122 | 128 | 129 | 127 | 131 |
| Button 1312 | 132 | 126 | 125 | 124 | 123 | 122 | 128 | 129 | 130 | 127 |

According to Table 1 above, the "overlay image" included in each button may be an image on which each of '0' to '9' individual numeric images is overlaid in common. In one "overlay image", an individual numeric image may have a different (but similar) pixel value. In the buttons 1301 to 1312, a specified pixel value may be assigned to an individual numeric image representing a number which should remain. For example, according to Table 1 above, the "overlay images" included in the buttons 1301, 1302, 1304, 1305, 1306, 1307, 1308, 1310, 1311, and 1312 may implement 1, 2, 3, 4, 5, 6, 7, 8, 9, and 0, respectively. In the "overlay images" included in the buttons 1301, 1302, 1304, 1305, 1306, 1307, 1308, 1310, 1311, and 1312, a pixel value "127" may be assigned to each of individual numeric images representing 1, 2, 3, 4, 5, 6, 7, 8, 9, and 0.

In addition, pixel values configuring a symbol, a button, a notice, and the like except for the "overlay images" may include a pixel value which is "127" or at least "127".

According to an embodiment, a demodulator 343 included in a DDI 300 may demodulate the modulated image data 1310. For example, the demodulator 343 may demodulate the modulated image data 1310 by passing pixels value having "127" among pixel values configuring the modulated image data 1310 and filtering out pixel values having a value different from "127". A screen 1320 based on the demodulated image data may fail to strictly provide a seamless image. However, a number, a character, and a symbol may be sufficiently distinguished from a background visually by a user on the screen 1320 based on the demodulated image data.

According to various embodiments of the present disclosure, although the third party takes image data from a GRAM included in a DDI, he or she may fail to obtain sensitive information such as user unique information. Thus, security on a hardware plane about the user unique information may be further enhanced.

As described above, an electronic device according to an embodiment may include a display, a processor, and a display driver integrated circuit (DDI) configured to drive the display. The DDI may include a graphic random access memory (GRAM) storing a first image received from the processor, a memory storing a second image including a plurality of partial images, an image merging module configured to read at least one partial image control information received from the processor is indicative of from the memory, read the first image from the GRAM, and merge the at least one partial image with the first image, and a display timing controller configured to generate a signal corresponding to the merged image and provide the generated signal to the display.

According to an embodiment, the first image may include a user authentication screen of an application to which a specified security policy is applied.

According to an embodiment, the plurality of partial images may include an individual image of at least one of a number, a character, or a symbol.

According to an embodiment, the control information may include information for specifying the at least one partial image and information associated with a location where the at least one partial image is merged on the first image.

An image display method according to an embodiment may include storing, by a processor, a first image in a GRAM included in a DDI, reading, by an image merging module included in the DDI, the first image from the GRAM, reading, by the image merging module, at least one partial image from a memory based on control information received from the processor, the memory being included in the DDI and storing a second image including a plurality of partial images, merging, by the image merging module, the at least one partial image with the first image, and generating, by a display timing controller included in the DDI, a signal corresponding to the merged image and providing, by the display timing controller, the generated signal to the display.

According to an embodiment, the first image may include a user authentication screen of an application to which a specified security policy is applied.

According to an embodiment, the plurality of partial images may include an individual image of at least one of a number, a character, or a symbol.

According to an embodiment, the control information may include information for specifying the at least one partial image and information associated with a location where the at least one partial image is merged on the first image.

An electronic device according to another embodiment may include a display, a DDI configured to drive the display, and a processor. The processor may be configured to modulate pixel values configuring image data and provide the modulated image data to the DDI. The DDI may be configured to demodulate the modulated image data and generate a signal corresponding to the demodulated image data and provide the generated signal to the display.

According to an embodiment, the image data may be classified as a first group of pixel values of less than a threshold of a specified range or a second group of pixel values of greater than or equal to the threshold of the specified range. The processor may be configured to modulate the image data by changing the first group of pixel values to a first value and changing the second group of pixel values to a second value. The first value and the second value may be adjacent to each other within the specified range.

According to an embodiment, the DDI may demodulate the modulated image data by changing the first group of pixel values to a third value and changing the second group of pixel values to a fourth value. The third value and the fourth value may have a difference greater than a difference between the first value and the second value.

According to an embodiment, the image data may include a user authentication screen of an application to which a specified security policy is applied. At least a portion of the first group of pixel values may configure at least one of a number, a character, or a symbol for entering a password or a personal identification number (PIN). At least a portion of the second group of pixel values may configure a background of the user authentication screen.

According to an embodiment, the image data may be classified as a first group of pixel values of less than a specified threshold or a second group of pixel values of greater than or equal to the specified threshold. The processor may be configured to modulate the image data by changing the first group of pixel values to a first random value and changing the second group of pixel values to a second random value. The first random value may be selected within a first range, and the second random value may be selected within a second range. The first range and the second range may be mutually exclusive.

According to an embodiment, the DDI may be configured to demodulate the modulated image data by changing the first group of pixel values within the first range to a third value and changing the second group of pixel values within the second range to a fourth value.

According to an embodiment, the DDI may be configured to distinguishably generate a signal corresponding to the first group of pixel values and a signal corresponding to the second group of pixel values by adjusting a gamma correction curve.

According to an embodiment, the processor may be configured to modulate the image data by encrypting pixel values configuring the image data. The DDI may be configured to demodulate the modulated image data by decrypting the pixel values configuring the image data.

According to an embodiment, the image data may be classified as a first group of pixel values of less than a specified threshold or a second group of pixel values of greater than or equal to the specified threshold. The processor may be configured to modulate the image data by changing each of the first group of pixel values and the second group of pixel values to a random value, changing a least significant bit (LSB) or a most significant bit (MSB) of the first group of pixel values to a first digital value, and changing an LSB or MSB of the second group of pixel values to a second digital value different from the first digital value.

According to an embodiment, the DDI may be configured to demodulate the modulated image data by changing the first group of pixel values, an LSB or MSB of which is the first digital value, to a third value and changing the second group of pixel values, an LSB or MSB of which is the second digital value, to a four value.

According to an embodiment, the processor may be configured to modulate the image data by changing a pixel value of a specified rate among pixel values configuring the image data to a random value.

According to an embodiment, the DDI may be configured to demodulate the modulated image data by filtering out the random value among the pixel values configuring the image data.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

What is claimed is:

1. An electronic device, comprising:
a display;
a processor; and
a display driver integrated circuit (DDI) configured to drive the display,
wherein the DDI comprises:
a first memory storing a first image received from the processor;
a second memory storing a plurality of partial images;
circuitry configured to read the first image from the first memory, read at least one of the plurality of partial images from the second memory, and generate a display image with the at least one partial image and the first image based on information from the processor; and
a display timing controller configured to generate a signal corresponding to the display image and provide the generated signal to the display,
wherein the plurality of partial images comprises a plurality of alphanumeric characters or symbols,
wherein the first image includes a virtual keyboard without a plurality of alphanumeric characters or symbols on keys of the virtual keyboard,
wherein a virtual keyboard of the display image for entering a personal identification number (PIN) or a password is generated based on the virtual keyboard of the first image and at least one partial image,
wherein a modulated image is generated by overlaying a plurality of images including the display image,
wherein each of the plurality of images include a security area,
wherein the security area is an area including a plurality of numeric images provided to enter the PIN,
wherein the security area of each of the plurality of images is configured with a plurality of pixel values, wherein a first group of pixels configuring the plurality of numeric images are located at a difference location and assigned the pixel values, wherein a second group of pixels configuring a background of the security area are assigned a plurality of random values, wherein layouts of the plurality of numeric images differ from each other on the security area, and wherein the modulated image includes an overlaid numeric image which is difficult to substantially identify in the security area.

2. The electronic device of claim 1, wherein the first image comprises a user authentication screen of an application to which a security policy of a specified range is applied.

3. The electronic device of claim 1, wherein the plurality of partial images include individual images of numbers provided to enter the PIN or the password.

4. The electronic device of claim 1, wherein the control information comprises information for specifying the at least one partial image and information associated with a location where the at least one partial image is merged on the first image.

* * * * *